United States Patent
Jung et al.

(10) Patent No.: US 9,892,330 B2
(45) Date of Patent: Feb. 13, 2018

(54) NIGHT-TIME FRONT VEHICLE DETECTION AND LOCATION MEASUREMENT SYSTEM USING SINGLE MULTI-EXPOSURE CAMERA AND METHOD THEREFOR

(71) Applicant: INDUSTRY ACADEMIC COOPERATION FOUNDATION OF YEUNGNAM UNIVERSITY, Gyeongsan-si, Gyeongsangbuk-do (KR)

(72) Inventors: Ho Youl Jung, Gyeongsan-si (KR); Hee Yong Lee, Gyeongsan-si (KR); Dal Hyun Jang, Gyeongsan-si (KR); Seung Hwan Lee, Gyeongsan-si (KR); Chang Hyeon Park, Gyeongsan-si (KR)

(73) Assignee: INDUSTRY ACADEMIC COOPERATION FOUNDATION OF YEUNGNAM UNIVERSITY, Gyeongsangbuk-Do (KR)

(*) Notice: Subject to any disclaimer, the term of this patent is extended or adjusted under 35 U.S.C. 154(b) by 35 days.

(21) Appl. No.: 15/029,150

(22) PCT Filed: Sep. 18, 2014

(86) PCT No.: PCT/KR2014/008709
§ 371 (c)(1),
(2) Date: Apr. 13, 2016

(87) PCT Pub. No.: WO2015/056890
PCT Pub. Date: Apr. 23, 2015

(65) Prior Publication Data
US 2016/0267333 A1    Sep. 15, 2016

(30) Foreign Application Priority Data
Oct. 14, 2013   (KR) .................. 10-2013-0122075

(51) Int. Cl.
*G06K 9/00* (2006.01)
*B60R 1/00* (2006.01)
(Continued)

(52) U.S. Cl.
CPC ............ *G06K 9/00825* (2013.01); *B60R 1/00* (2013.01); *G01S 3/7864* (2013.01);
(Continued)

(58) Field of Classification Search
CPC .. G06K 9/00825; G06K 9/481; G06K 9/6269; G06K 9/342; G06K 9/628;
(Continued)

(56) References Cited

U.S. PATENT DOCUMENTS

| 5,837,994 | A | 11/1998 | Stam et al. |
| 5,923,027 | A | 7/1999 | Stam et al. |

(Continued)

FOREIGN PATENT DOCUMENTS

| JP | 2007187618 A | 7/2007 |
| JP | 4218670 B2 | 2/2009 |
| KR | 1020010075206 A | 8/2001 |

OTHER PUBLICATIONS

Notice of Allowance dated Mar. 30, 2015 issued by Korean Patent Office for Korean Patent Application No. 10-2013-0122075, which is a priority application to the present national phase application.

*Primary Examiner* — Li Liu
(74) *Attorney, Agent, or Firm* — Porzio Bromberg & Newman P.C.

(57) ABSTRACT

The present application relates to a system for location measurement and night-time forward vehicle detection using a single multi-exposure camera and method thereof which use a long exposure and short exposure frame images among four exposure methods of a multi-exposure camera and applies a binarization method which use a local adaptive (Continued)

threshold value, and also applies a BLOB (Binary Large Objects) matching method which detects an identical candidate BLOB from a different exposure frame image thereby, enables further accurate detection and location measurement of a forward vehicle during night-time drive.

7 Claims, 5 Drawing Sheets

(51) Int. Cl.
*G01S 3/786* (2006.01)
*G06K 9/34* (2006.01)
*G06K 9/48* (2006.01)
*G06K 9/62* (2006.01)
*H04N 1/60* (2006.01)
*H04N 5/235* (2006.01)
*G06T 7/73* (2017.01)
*G01S 11/12* (2006.01)

(52) U.S. Cl.
CPC ......... *G06K 9/00791* (2013.01); *G06K 9/342* (2013.01); *G06K 9/481* (2013.01); *G06K 9/628* (2013.01); *G06K 9/6269* (2013.01); *G06T 7/73* (2017.01); *H04N 1/6022* (2013.01); *H04N 5/2353* (2013.01); *B60R 2300/106* (2013.01); *G01S 11/12* (2013.01); *G06T 2207/10016* (2013.01); *G06T 2207/10144* (2013.01); *G06T 2207/30261* (2013.01)

(58) Field of Classification Search
CPC ...... B60R 1/00; H04N 1/6022; H04N 5/2353; G01S 3/7864
See application file for complete search history.

(56) References Cited

U.S. PATENT DOCUMENTS

| | | |
|---|---|---|
| 5,990,469 A | 11/1999 | Bechtel et al. |
| 6,049,171 A | 4/2000 | Stam et al. |
| 6,097,024 A | 8/2000 | Stam et al. |
| 6,130,421 A | 10/2000 | Bechtel et al. |
| 6,255,639 B1 | 7/2001 | Stam et al. |
| 6,262,410 B1 | 7/2001 | Stam et al. |
| 6,281,632 B1 | 8/2001 | Stam et al. |
| 6,291,812 B1 | 9/2001 | Bechtel et al. |
| 6,429,594 B1 | 8/2002 | Stam et al. |
| 6,469,739 B1 | 10/2002 | Bechtel et al. |
| 6,495,815 B1 | 12/2002 | Stam et al. |
| 6,587,573 B1 | 7/2003 | Stam et al. |
| 6,593,698 B2 | 7/2003 | Stam et al. |
| 6,611,610 B1 | 8/2003 | Stam et al. |
| 6,631,316 B2 | 10/2003 | Stam et al. |
| 6,653,614 B2 | 11/2003 | Stam et al. |
| 6,653,615 B2 | 11/2003 | Bechtel et al. |
| 6,681,163 B2 | 1/2004 | Stam et al. |
| 6,728,393 B2 | 4/2004 | Stam et al. |
| 6,774,988 B2 | 8/2004 | Stam et al. |
| 6,853,897 B2 | 2/2005 | Stam et al. |
| 6,861,809 B2 | 3/2005 | Stam |
| 6,868,322 B2 | 3/2005 | Stam et al. |
| 6,906,467 B2 | 6/2005 | Stam et al. |
| 6,919,548 B2 | 7/2005 | Stam et al. |
| 6,924,470 B2 | 8/2005 | Bechtel et al. |
| 6,928,180 B2 | 8/2005 | Stam et al. |
| 6,946,639 B2 | 9/2005 | Stam et al. |
| 6,947,576 B2 | 9/2005 | Stam et al. |
| 6,947,577 B2 | 9/2005 | Stam et al. |
| 7,019,275 B2 | 3/2006 | Stam et al. |
| 7,149,613 B2 | 12/2006 | Stam et al. |
| 7,199,346 B2 | 4/2007 | Stam et al. |
| 7,302,326 B2 | 11/2007 | Stam et al. |
| 7,408,136 B2 | 8/2008 | Bechtel et al. |
| 7,432,967 B2 | 10/2008 | Bechtel et al. |
| 7,485,844 B2 | 2/2009 | Stam et al. |
| 7,613,327 B2 | 11/2009 | Stam et al. |
| 7,630,803 B2 | 12/2009 | Stam et al. |
| 7,653,215 B2 | 1/2010 | Stam |
| 7,825,600 B2 | 11/2010 | Stam et al. |
| 2002/0005472 A1 | 1/2002 | Stam et al. |
| 2002/0043612 A1 | 4/2002 | Bechtel et al. |
| 2002/0060522 A1 | 5/2002 | Stam et al. |
| 2002/0156559 A1 | 10/2002 | Stam et al. |
| 2002/0195949 A1 | 12/2002 | Stam et al. |
| 2003/0058346 A1 | 3/2003 | Bechtel et al. |
| 2003/0069674 A1 | 4/2003 | Stam et al. |
| 2003/0107323 A1 | 6/2003 | Stam |
| 2003/0123705 A1 | 7/2003 | Stam et al. |
| 2003/0123706 A1 | 7/2003 | Stam et al. |
| 2003/0138131 A1 | 7/2003 | Stam et al. |
| 2003/0138132 A1 | 7/2003 | Stam et al. |
| 2004/0000631 A1 | 1/2004 | Stam et al. |
| 2004/0008110 A1 | 1/2004 | Stam et al. |
| 2004/0021853 A1 | 2/2004 | Stam et al. |
| 2004/0031907 A1 | 2/2004 | Bechtel et al. |
| 2004/0034457 A1 | 2/2004 | Stam et al. |
| 2004/0046103 A1 | 3/2004 | Stam et al. |
| 2004/0069931 A1 | 4/2004 | Stam et al. |
| 2004/0144911 A1 | 7/2004 | Stam et al. |
| 2004/0153225 A1 | 8/2004 | Stam et al. |
| 2004/0227814 A1* | 11/2004 | Choi ................. B60R 1/00 348/148 |
| 2005/0007579 A1 | 1/2005 | Stam et al. |
| 2005/0073853 A1 | 4/2005 | Stam |
| 2005/0083432 A1* | 4/2005 | Honda ............... H04N 5/232 348/362 |
| 2005/0098712 A1 | 5/2005 | Stam et al. |
| 2005/0165526 A1 | 7/2005 | Stam et al. |
| 2005/0218298 A1 | 10/2005 | Bechtel et al. |
| 2005/0219852 A1 | 10/2005 | Stam et al. |
| 2005/0242740 A1 | 11/2005 | Stam et al. |
| 2006/0018511 A1 | 1/2006 | Stam et al. |
| 2006/0018512 A1 | 1/2006 | Stam et al. |
| 2006/0065821 A1 | 3/2006 | Stam et al. |
| 2006/0091813 A1 | 5/2006 | Stam et al. |
| 2006/0177098 A1 | 8/2006 | Stam |
| 2007/0073484 A1 | 3/2007 | Horibe |
| 2007/0093949 A1 | 4/2007 | Stam et al. |
| 2007/0165967 A1 | 7/2007 | Ando et al. |
| 2007/0194208 A1 | 8/2007 | Stam et al. |
| 2008/0044062 A1 | 2/2008 | Stam et al. |
| 2008/0129206 A1 | 6/2008 | Stam et al. |
| 2008/0195276 A1 | 8/2008 | Stam et al. |
| 2011/0074957 A1* | 3/2011 | Kiyohara ............ G06K 9/342 348/148 |
| 2012/0300074 A1* | 11/2012 | Hasegawa ........... H04N 5/235 348/148 |
| 2013/0083971 A1* | 4/2013 | Du ................. G06K 9/00825 382/104 |
| 2013/0182111 A1* | 7/2013 | Ogasawara ............ H04N 7/18 348/148 |
| 2015/0054955 A1* | 2/2015 | Lim .................... B60R 1/00 348/148 |
| 2015/0117715 A1* | 4/2015 | Murao ............ G06K 9/00825 382/104 |
| 2016/0240085 A1* | 8/2016 | Otsuka ............ G06K 9/00805 |

* cited by examiner

Step 1 : preprocessing step

Step 2 : Candidate BLOB extracting

NIGHT-TIME FRONT VEHICLE DETECTION AND LOCATION MEASUREMENT SYSTEM USING SINGLE MULTI-EXPOSURE CAMERA AND METHOD THEREFOR

TECHNICAL FIELD

The following description relates to a night-time forward vehicle detection and location measurement system using a single multi-exposure camera and method thereof which may be effectively applied on an active/intelligent headlight system. The following description also relates to a night-time forward vehicle detection and location measurement system using a single multi-exposure camera and method thereof to overcome a disadvantage of using a single exposure camera which was often used.

BACKGROUND

Currently, when driving at night time, most drivers manually operate high beam and low beam to secure driver's view. However, using high beam is limited since it is difficult to operate manually.

When high-speed driving at night, it is necessary to drive with the high beam on to adequately detect and respond to dangers ahead. However, when driving with the high beam on, it can cause glariness to the driver of the vehicle ahead (oncoming car and forward driving vehicle).

In order to overcome the afore-mentioned disadvantage, an intelligent headlight system which automatically operates two steps of high beam and low beam, is recently developed. It determines a vehicle ahead within the range of the headlight using a camera disposed on the vehicle wind shield.

Recently, a headlight using HID (High Intensity Discharge) and LED (Light Emitting Diode) has been developed thereby, the headlight can be operated with a beam which is segmented according to angles and not operated with the two steps of high beam and low beam. Thus, an active/intelligent headlight configured to direct the beam towards the vehicle ahead reaches just before the location of the vehicle should be developed.

SUMMARY OF INVENTION

Solution to Problem

The following description aims to overcome the problem of the afore-mentioned related art. The description provides a night-time forward vehicle detection and location measurement system using a single multi-exposure camera and method thereof which use long exposure and short exposure frame images among four exposure methods of a multi-exposure camera and applies binarization method which use local adaptive threshold value, and also applies BLOB (Binary Large Objects) matching method which detects an identical candidate BLOB from different exposure frame images thereby, enables further accurate detection and location measurement of a vehicle ahead during night-time drive.

Technical Solutions

A method for a night-time forward vehicle detection and location measurement system using a single multi-exposure camera includes a preprocessing, to select long exposure and short exposure frame images among auto exposure, long exposure, middle exposure and short exposure of a multi-exposure camera; a candidate BLOB extracting to label and extract a candidate region by using a local maximum based binarization method to minimize binarization by adding at least two BLOBs at the long exposure frame image and, extracting the candidate region through labeling and, using a local-mean based binarization to extract a headlight and taillight of long distance in the short exposure frame image to a candidate region; a BLOB matching and feature extracting to predict a BLOB location using a BLOB tracking based on a short exposure frame and detecting an identical candidate BLOB in a different exposure frame image by designating a BLOB of a location which is closest to a predicted location of the long exposure frame then, extracting a specific information regarding an identical candidate BLOB from a different exposure frame image; and a MC_SVM classifying to classify related BLOB to headlight, taillight, reflector and illuminant using MC_SVM (Multi-Class SVM) based on the features extracted from the long and short exposure frame; classifying and pairing to conduct pairing which detects a BLOB determined as an identical vehicle by comparing the BLOBs classified as a headlight and taillight in the MC_SVM classifying according to barycentric coordinates.

Effects of Invention

A night-time forward vehicle detection and location measurement system using a single multi-exposure camera and method thereof use a long exposure and short exposure frame images among four exposure methods of the multi-exposure camera and applied binarization which uses a local adaptive threshold value and applies a BLOB matching to detect an identical candidate BLOB in a different exposure frame thereby, various feature information can be extracted through a feature information extracting in respect to the identical candidate BLOB. Thus, there may be an effect of further accurate detection and location measurement of a vehicle ahead during night-time.

METHOD FOR CARRYING OUT THE INVENTION

Figure 1:
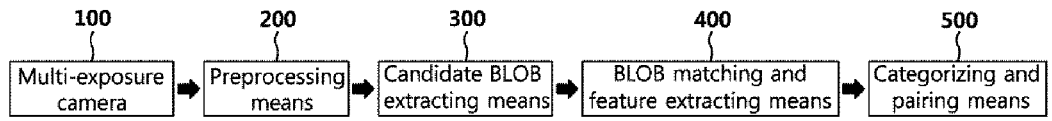
FIG. 1 is an exemplary block diagram illustrating a system for a location measurement and night-time forward vehicle detection using a single multi-exposure camera according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The examples are described more fully subsequently with reference to the accompanying drawings, in which certain embodiments are shown.

First, when using an auto exposure camera, a brightness of a headlight and taillight of a vehicle in object for detection is not consistent due to luminous environment and sometimes misrecognizes various reflectors and illuminants in the surrounding of the vehicle in object for detection.

Further, when using a long single exposure camera, a brightness value of most headlights and taillights appeared in an image is saturated and, a phenomenon of blurring and two BLOBs adding occurs. Thus, accurate detection is difficult and misrecognition occurs due to various noise light when a BLOB is moving.

Further, when using a short single exposure camera, it is difficult to detect a headlight and taillight from a long distance with a small BLOB and the brightness value and various feature information of the BLOB are difficult to extract. Thus, it is difficult to expect high functional detection.

A problem of the aforementioned-like single exposure camera was solved by using a multi-exposure camera according to an embodiment.

That is, a multi-exposure camera which may overcome a disadvantage of a method for using a single exposure camera is used. Further, a common color camera which supports four types of exposures, i.e., auto exposure, long exposure, middle exposure and short exposure are used and the long exposure and short exposure are used herein. For example, a frame having a relatively large exposure is used as a long exposure frame and a frame having a relatively small exposure is used as a short exposure frame.

The advantage and disadvantage of the aforementioned images are shown in the following Table 1.

TABLE 1

| Image | Advantage | Disadvantage |
|---|---|---|
| Long exposure frame | Possible of long distance BLOB detection Possible extraction of various features of BLOB | Blurring phenomena of a moving BLOB At least two BLOBs are added, and a brightness value of most head lamps/taillights is saturated and, various noise lights such as a reflector occur. |
| Short exposure frame | Possible of accurate location measurement of a BLOB | Difficult to detect long distance BLOB Difficult to differentiate the light of a head lamp and taillight from the noise light due to lack of various feature information of a BLOB |

Further, a binarization which is adequate for respective images is applied according to an embodiment.

The binarization which uses a global constant threshold value has the following problem.

The binarization in general, binarizes an image through applying a predetermined constant threshold value on a whole image and thereby, detects a candidate region of the headlight and taillight of the vehicle.

When the global constant threshold value is applied on the long exposure frame, various noise lights such as the reflector may be extracted to the candidate region and at least two BLOBs are added and extracted to the candidate region. Further, when the global constant threshold value is applied on the short exposure frame, the BLOB size of the headlight and taillight in a long distance is small and the brightness thereof is also not large thereby, they may not be detected as the candidate region. Thus, detection may be degraded.

The binarization which uses local adaptive threshold value is applied according to an embodiment to overcome the aforementioned problem.

Further, a local maximum based binarization is used to minimize binarization which at least two BLOBs are added in the long exposure frame, and the BLOB is labeled and then extracted to the candidate region.

Further, in a short exposure frame image, a local-mean based binarization is used to extract the headlight and taillight in long distance to the candidate region from a short exposure frame image and the BLOB is labeled then extracted to the candidate region.

Meanwhile, there is a time delay (in case of a camera with 60 frames per second which supports four types of exposures, the time delay which occurs between the long exposure and short exposure frames is 16.6 to 49.9 msec in maximum), in the long exposure frame and short exposure frame which is output from the multi-exposure camera. Accordingly, although it may differ according to a speed in respect to the object, a location in a long exposure frame and a short exposure frame moves even it is an identical object. Thus, even it is a headlight or a taillight of an identical vehicle, the candidate BLOB which is extracted from the long exposure frame and the candidate BLOB which is extracted from a short exposure frame can be considered as a separate object.

Accordingly, the BLOB matching and feature extracting are conducted to overcome the aforementioned problem according to an embodiment.

That is, various feature information can be extracted since the feature information extracting of the identical candidate BLOB from different exposure frame image can be applied through the BLOB matching which detects the identical candidate BLOB from the different exposure frame image, i.e., a method of predicting a location of a BLOB using the short exposure frame based BLOB tracking and considering the BLOB which is closed to the predicted location of a long exposure frame, as an identical BLOB.

Method for Carrying Out the Invention

Hereinafter, an embodiment is illustrated referring to the drawings attached herewith.

FIG. 1 is a block diagram illustrating a night-time forward vehicle detection and location measuring system using a single multi-exposure camera.

The following description includes a multi-exposure camera 100 configured to support auto exposure, long exposure, middle exposure and short exposure; a preprocessing means 200 configured to select a long exposure and short exposure frame image among the auto exposure, long exposure, middle exposure and short exposure of the multi-exposure camera 100; a candidate BLOB extracting means 300 configured to extract the candidate region by using and labeling a local maximum based binarization to minimize binarization phenomena which occurs as at least two BLOBs are added in the long exposure image and extracts the candidate region by using and labeling the local-mean based binarization to extract a headlight and taillight in a long distance from the short exposure frame image to the candidate region; a BLOB matching and feature extracting means 400 configured to extract feature information regarding an identical candidate BLOB from a different exposure frame image after detecting the identical candidate BLOB from a different exposure frame by considering the BLOB which is the closest to the predicted location of the long exposure frame as an identical BLOB after predicting the location of the BLOB using a short exposure frame based BLOB tracking; and, a classifying and pairing means 500 including a MC_SVM classifying to classify related BLOBs to the headlight, taillight, reflector and illuminant using MC_SVM (Multi-Class SVM) based on the features extracted from the long and short exposure frames; classifying and pairing to conduct pairing which detects a BLOB determined as an identical vehicle by comparing the BLOBs classified as the headlight and taillight in the MC_SVM classifying according to barycentric coordinates.

Figure 2:
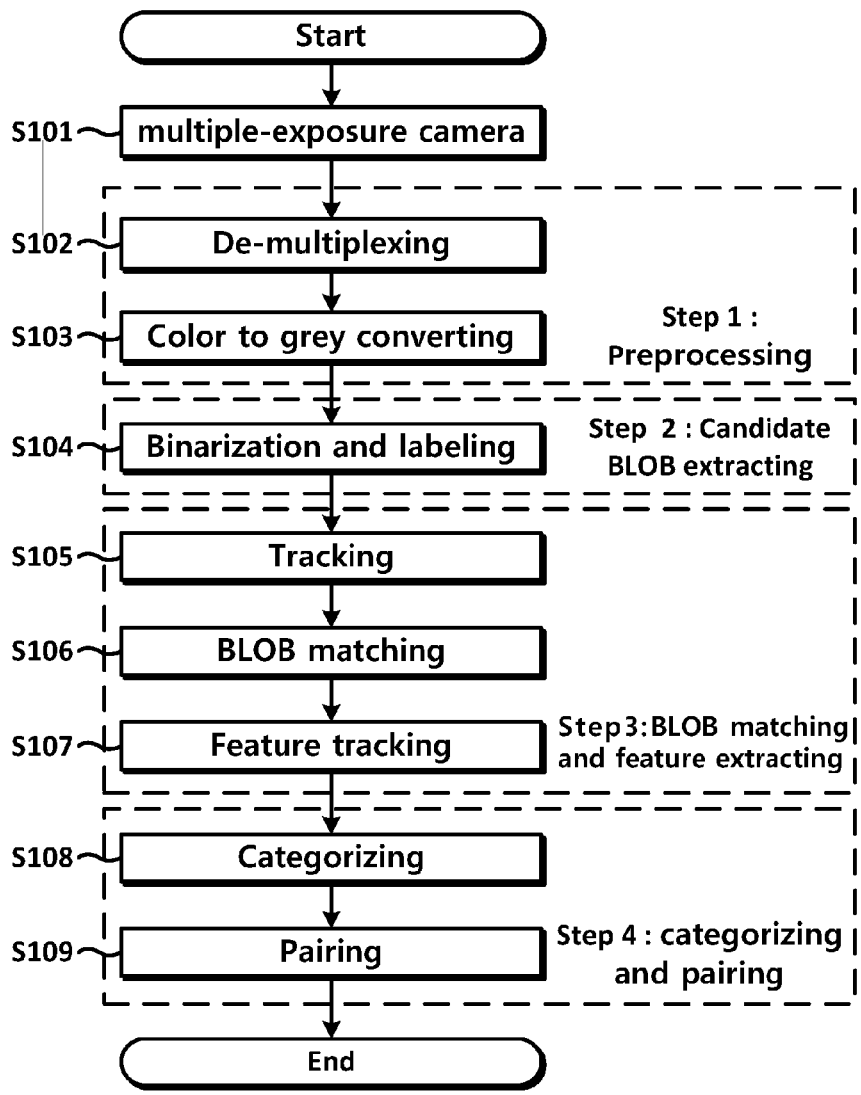
FIG. 2 is a flow chart illustrating a system for a location measurement and night-time forward vehicle detection using a single multi-exposure camera according to an embodiment.

FIG. 2 is a flow chart illustrating a night-time forward vehicle detection and location measuring method using a single multi-exposure camera according to an embodiment.

As illustrated, the following description includes a pre-processing S102-S103 converting respective images to a gray image through selecting long exposure and short exposure frame images among auto exposure, long exposure, middle exposure and short exposure of the multi-exposure camera 100;

a candidate BLOB extracting S104 conducting labeling and extracting to a candidate region by using a local maximum based binarization method to minimize binarization by adding at least two BLOBs at the long exposure frame image and, extracting a candidate region through labeling and, using a local-mean based binarization to extract a headlight and taillight of long distance in the short exposure frame image to a candidate region;

a BLOB matching and feature extracting S105-S107 predicting a BLOB location using a BLOB tracking based on a short exposure frame and detecting an identical candidate BLOB in a different exposure frame image by designating a BLOB of a location which is closest to a predicted location of the long exposure frame then, extracting a specific information regarding an identical candidate BLOB from a different exposure frame image; and, a classifying and pairing S108-S109 which conducts a MC_SVM classifying which conducts classifying related BLOBs to a headlight, a taillight, a reflector and an illuminant using MC_SVM (Multi-Class SVM) based on the features extracted from the long and short exposure frame; and pairing which detects a BLOB determined as an identical vehicle by comparing the BLOBs classified as a headlight and taillight in the MC_SVM classifying according to barycentric coordinates.

An embodiment of the following description is applied as illustrated hereinafter.

Figure 3:
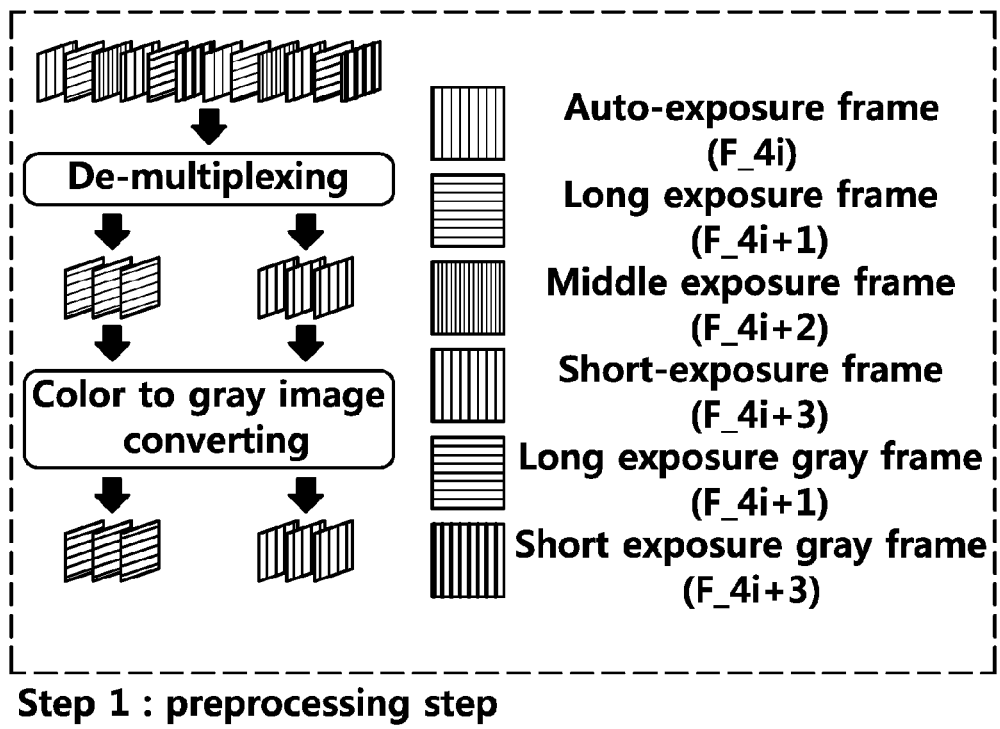
FIG. 3 is a flow chart illustrating a preprocessing according to an embodiment.

First, as illustrated in FIG. 2 and FIG. 3, the preprocessing comprises a de-multiplexer S102 and a color to grey converting S103.

During de-multiplexer S102, a camera output according to a multi (four kinds)-exposure camera may have different exposure outputs according to frames and generally auto exposure, long exposure, middle exposure and short exposure frames are repetitively and sequentially generated.

During de-multiplexer, long exposure frame and short exposure frame are selected among multi (four types)-exposure frames. Further, it is output through rearranging with the long exposure frame and short exposure frame to apply an adequate signal processing method according to the exposure feature.

A frame having a relatively large exposure among four types of the camera output unit exposure can be used with a long exposure frame and a frame having a relatively short exposure thereamong can be used with a short exposure when selecting a long exposure frame and a short exposure frame.

During color to grey converting S103, the color image of the long exposure frame and short exposure frame is converted to a gray image to detect a candidate region such as a headlight and taillight when using the color camera.

Further, when the color image is a RGB color image, the color image is converted with a linear combination of R, G, B and when the color image is a YBbCr color, a Y signal is used as a gray image.

Herein, an original color image may be stored in a separate memory to use as a feature value of a candidate region.

Figure 4:
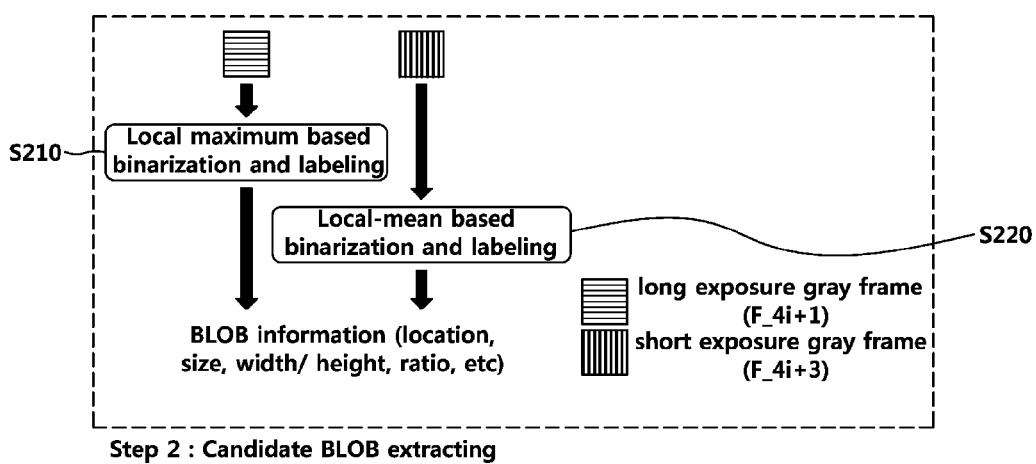
FIG. 4 is a flow chart illustrating a candidate BLOB extracting according to an embodiment.

Further, as illustrated in FIG. 4, a candidate BLOB extracting S104 includes a local maximum based binarization and labeling S210 and a local-mean based binarization and labeling S220.

First, the local maximum based binarization and labeling S210 minimizes binarization. That is, it minimizes the phenomena of at least two BLOBs are added by applying to the long exposure frame image.

Figure 5:
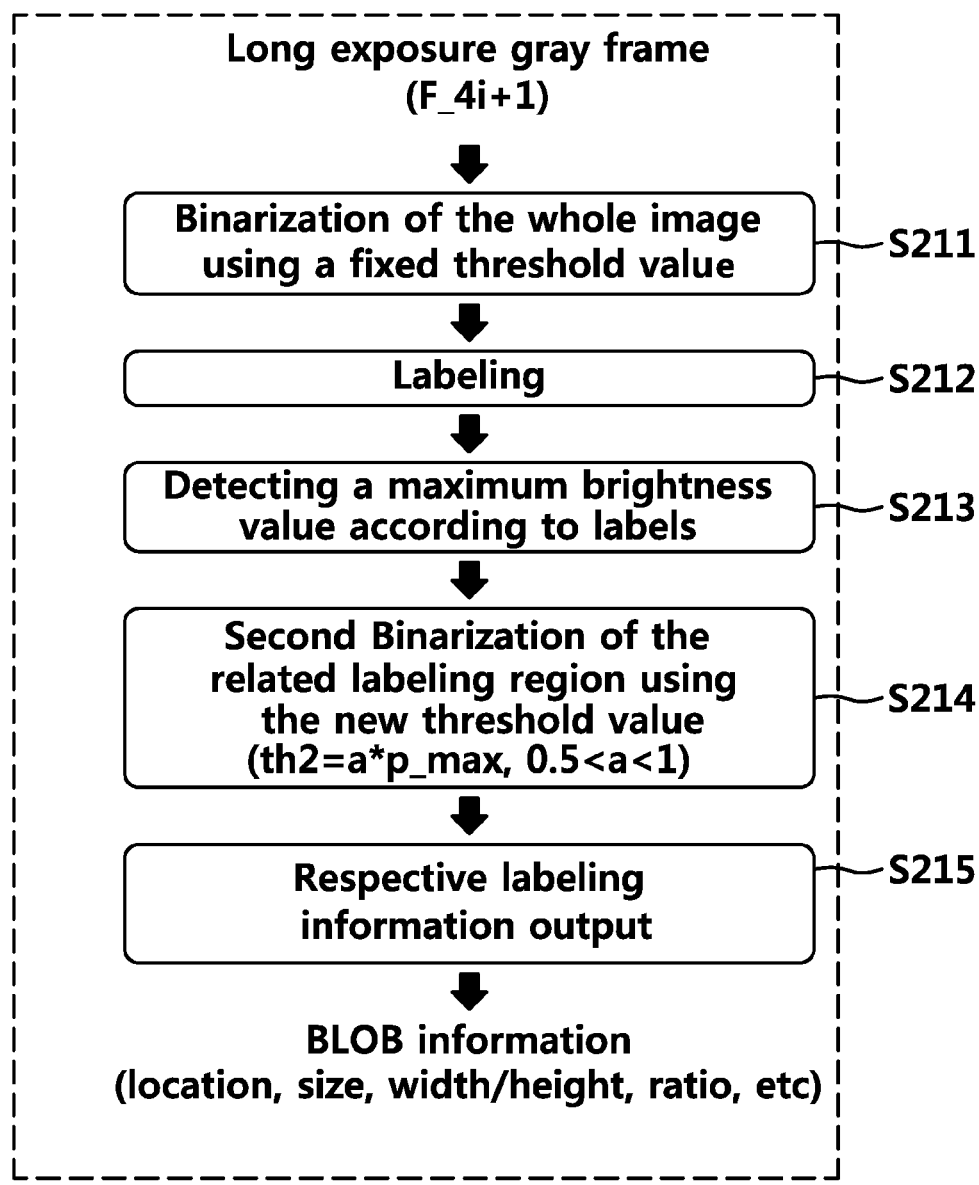
FIG. 5 is a flow chart further illustrating a local maximum based binarization and labeling of a candidate BLOB extracting according to an embodiment.

That is, as illustrated in FIG. 5, first binarize S211 the whole image using a predetermined fixed threshold value (Th_1) then, conduct labeling S212 and detect a maximum brightness value (p_max) for respective labels S213 and, produce a new threshold value (Th_2) according to the maximum brightness value then binarize the related label region using the equation, Th_2=a×p_max (but, 0.5<a<1) and after binarizing S214 the related label region, outputs S215 information of respective BLOBs which is labeled. Herein, when calculating the local maximum based threshold value, variable 'a' can be experimentally determined within the range of 0.5<a<1 and, it is preferably determined as about 0.9.

Next, the local-mean based binarization and labeling S220 is a combination of a local-mean brightness value reference binarization and a reference global binarization. That is, the near headlight and taillight are binarized using a predetermined fixed threshold (Th_3) and a headlight and taillight which is far and having a relatively small brightness value binarizes using a local-mean brightness.

Figure 6:
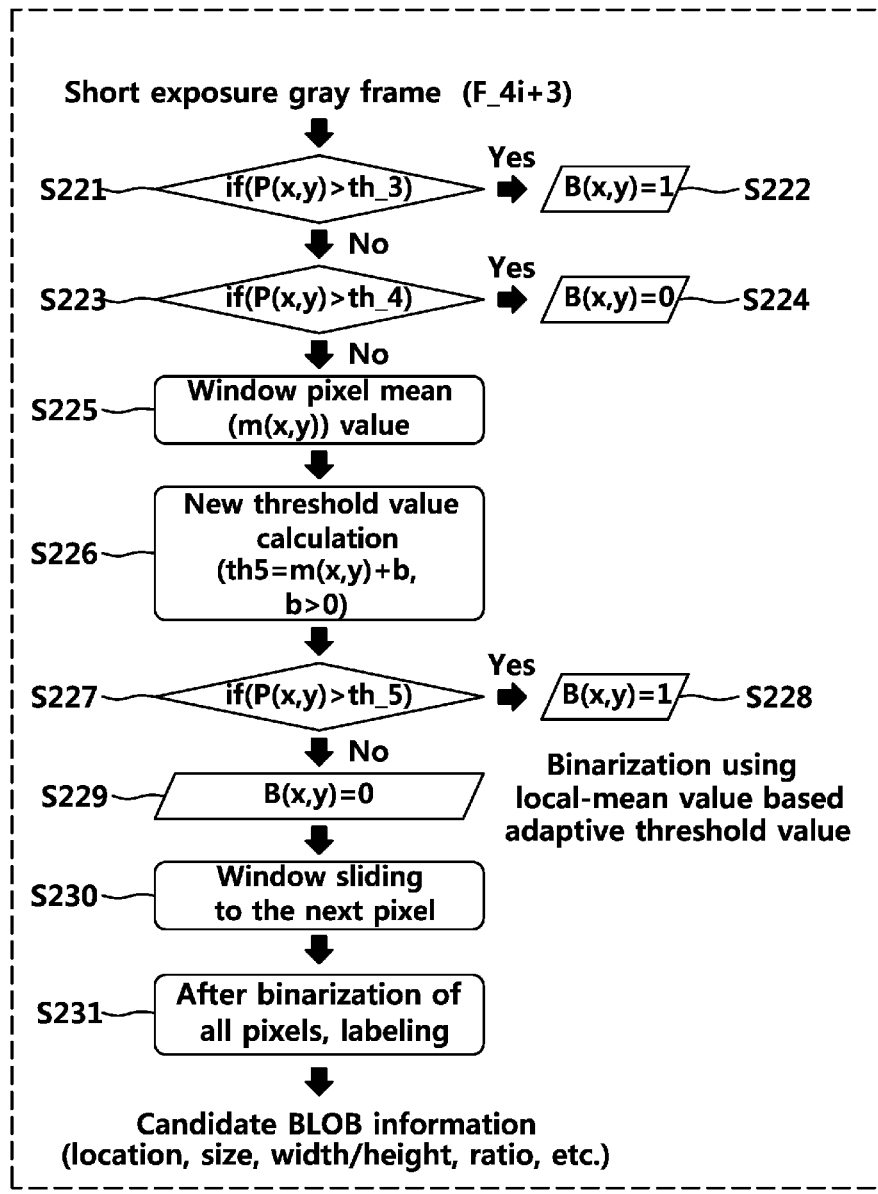
FIG. 6 is a flow chart further illustrating a local-mean based binarization and labeling of a candidate BLOB extracting according to an embodiment.

That is, as illustrated in FIG. 6, first slide a relatively small size two dimensional window and compare a pixel value p(x,y) of a center point with a predetermined fixed threshold value Th_3 S221. Then, when it is p(x,y)>Th_3, set as B(x,y)=1 and move to S230, S222. If it is not p(x,y)>Th_3, move to S223 in the following.

In S223, compare p(x,y) with a predetermined fixed threshold value Th_4 S223. When it is p(x,y)<Th_4, set to B(x,y)=0 and move to S230, S224. If it is not p(x,y)<Th_4, move to S225 in the following.

In S225-S226, calculate pixel average value m(x,y) in the window and calculate the Th_5 value with the average value as shown in the equation 1 below.

$$Th\_5 = m(x,y) + b \text{(but, } b>0\text{)} \qquad \text{Equation 1}$$

Next, in S227, compare p(x,y) with Th_5 and when it is p(x,y)>Th_5, set to B(x,y)=1 S228. If it is not p(x,y)>Th_5, set to B(x,y)=0 S229 and then move to S230.

In S230, start again from S221, after window sliding to the next pixel. Repeat this process to a last pixel in a frame. Then, conduct labeling in S231. Herein, use an integral image to calculate a real-time average value in the window.

A BLOB matching and feature extracting S105-S107 including a tracking, a matching, a feature extracting are illustrated hereinafter.

Figure 7:
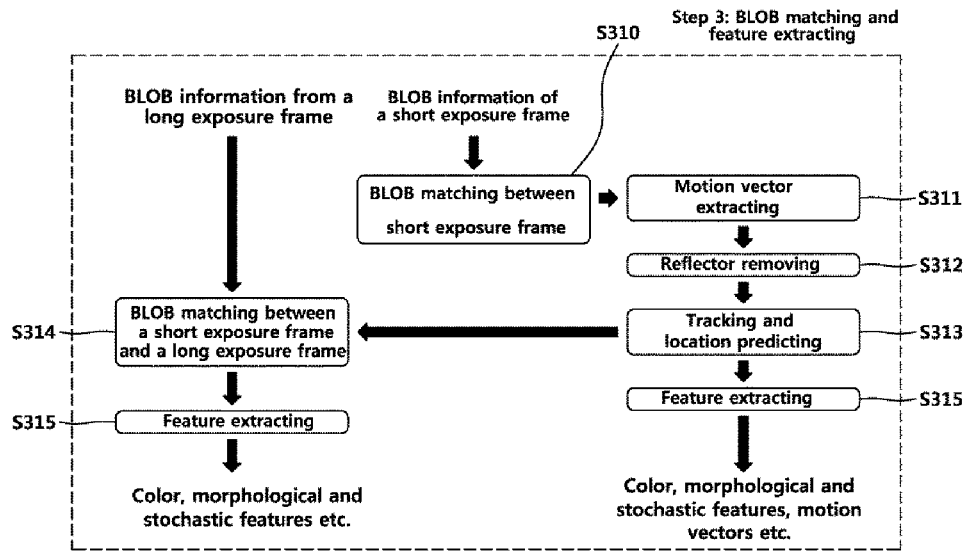
FIG. 7 is a flow chart illustrating a BLOB matching and feature extracting according to an embodiment.

As illustrated in FIG. 7, the BLOB matching and feature extracting S105-S107 include, in particular, a BLOB matching S310 between short exposure frames; a motion vector extracting S311; a reflector removing S312; a tracking and location prediction S313; the BLOB matching between a short exposure frame and long exposure frame; and feature extracting S315.

The BLOB matching S310 of short exposure frame detects which BLOB of a prior frame is identical with a random BLOB of a current frame among candidate BLOBs extracted from the short exposure frame and matching the BLOB with a minimum moving distance as an identical BLOB.

kth BLOB is b(t−1,k) among K number of BLOB of prior frames (herein, k=1, 2, . . . , K). A random $1^{st}$ BLOB among L number of BLOB of a current frame is b(t,l) (herein, 1=1, 2, . . . , L). A barycentric coordinates of the $1^{st}$ BLOB b(t,l) of the current frame is (x_c(t,l), y_c(t,l)) and a barycentric coordinate of the $k^{th}$ BLOB b(t−1,k) of a prior frame is (x_c(t−1,k), y_c(t−1,k)). Thus, the BLOB b(t,l) of the current frame can be matched with the BLOB of the prior frame with a shortest moving distance as an identical BLOB.

$$b(t-1, l^*) = \min_{1 \le k \le K} \left( \sqrt{\begin{array}{l}(x\_c(t, l) - x\_c(t-1, k))^2 + \\ (y\_c(t, l) - y\_c(t-1, k))^2\end{array}} \right) \quad \text{Equation 2}$$

According to equation 2, l* refers to a closest $l^{*th}$ BLOB value. Herein, the barycentric coordinates of respective BLOBs use a calculate value with actually calculated distance.

Further, it is preferable not to designate as an identical BLOB if the calculated distance is over the experimentally calculated predetermined distance.

Further, a motion vector extracting S311 calculates a motion vector (m)(t,l) in respect to a BLOB(b)(t,l) of a current frame using a BLOB matching result generated from the short exposure frame according to the following equation 3.

$$m(t,l) = ((x\_c(t,l) - x\_c(t-1,l^*)), (y\_c(t,l) - y\_c(t-1,l^*)))^t \quad \text{Equation 3}$$

Herein, the barycentric coordinates of respective BLOBs use the value which is applied with actually calculated distance thereby calculates the actual moving vector.

Further, a reflector removing S312 excludes a BLOB having a motion vector which differs from a motion vector of a headlight or taillight of a normal vehicle from a candidate BLOB object using a motion vector value produced from a short exposure frame.

Next, a tracking and location predicting tracks a location of respective BLOBs produced during the BLOB matching of the short exposure frame using Kalman Filter. The measurement value herein is determined with a transverse, vertical direction distance of a barycentric coordinates of a related BLOB and an estimated value is determined with a transverse, vertical direction distance, speed, and acceleration of a barycentric coordinates of a BLOB.

The identical BLOB location can be predicted in the long exposure frame using the BLOB tracking result of the short exposure frame. Herein, the location of respective BLOBs are predicted considering the delay time between the current frame of the short exposure image and the frame of the long exposure image.

Next, a BLOB matching S314 between the short exposure frame and long exposure frame determines a BLOB of a closest location as an identical BLOB using information of a predicted location of respective BLOBs of a long exposure frame produced from a BLOB tracking of a short exposure frame and a location information of a candidate BLOB of a long exposure frame produced from a local-mean based binarization and labeling.

Herein, there is time delay in the long exposure frame and the short exposure frame. For example, the location of an identical BLOB may move according to speed difference of over 16.6 msec to 49.9 msec in maximum hence, a separate compensate algorithm is required.

Next, feature extracting S315 extracts features regarding the identical BLOB calculated from the short exposure frame and long exposure frame.

BLOB features such as color, morphological, geometrical information, i.e., size, barycentric coordinates, aspect ratio of a bounding box, 2-D Hu's moment, and statistical information, i.e., average brightness of the BLOB and standard deviation of the brightness, motion vector are extracted from the short exposure frame.

Further, BLOB features such as color, morphological, geometrical information, i.e., size, barycentric coordinates, aspect ratio of a bounding box, 2-D Hu's moment, and statistical information, i.e., average brightness of the BLOB and standard deviation of the brightness, motion vector are extracted from the long exposure frame.

Figure 8:
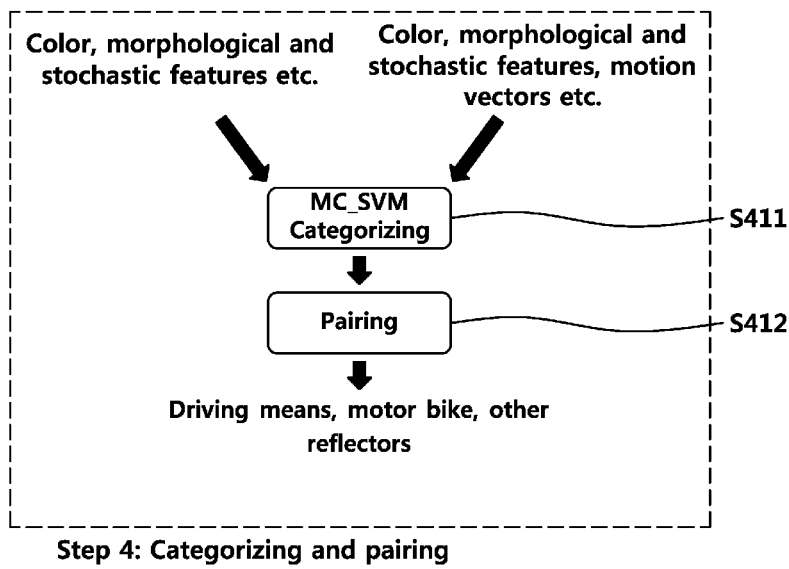
FIG. 8 is a flow chart illustrating a classifying and pairing according to an embodiment.

Finally, a classifying and pairing S108-S109 is conducted as illustrated in FIG. 8.

First, a MC_SVM classifying S411 classifies related BLOBs to a headlight, taillight, reflector and illuminant using MC_SVM (Multi-Class SVM) based on the features extracted from the long and short exposure frame.

Next, pairing S412 is conducted which detects a BLOB determined as an identical vehicle through comparing the BLOBs classified as a headlight and taillight according to similarity thereof such as barycentric coordinates, size and shape in the MC_SVM classifying S411. Herein, the similarity of the BLOBs is measured through comparing the BLOBs according to the shape of the headlight and taillight.

Accordingly, the aspect ratio of the bounding box, the ratio of a normal vehicle light is calculated by the following equation 4, after a pair of BLOBs which is determined as an identical vehicle is given in a bounding box.

Equation 4

$$\text{If } T_1 \le \frac{boundingbox\ \text{Width}}{boundingbox\ \text{Height}} \le T_2. \quad \text{Equation 4}$$

When the condition of Equation 4 is satisfied, it is determined as an identical vehicle and if not, it is determined as a different vehicle.

Herein, T_1, T_2 can be calculated experimentally. Further, it can be determined as a motorbike and not a normal vehicle when it is determined as a BLOB which is not added as a pair thereof.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

INDUSTRIAL APPLICABILITY

According to a night-time forward vehicle detection using a single multi-exposure camera and method thereof which use long exposure and short exposure frame images among four exposure methods of a multi-exposure camera and applies a binarization method which use a local adaptive threshold value, and also applies a BLOB (Binary Large Objects) matching method which detects an identical candidate BLOB from a different exposure frame image thereby, enables further accurate detection and location measurement of a forward vehicle during night-time drive.

What is claimed is:

1. A method for location measurement and night-time forward vehicle detection using a single multi-exposure camera comprising:
   a preprocessing to select a long exposure frame image and a short exposure frame image among an auto exposure, a long exposure, a middle exposure and a short exposure of a multi-exposure camera;
   a candidate BLOB (Binary Large Objects) extracting to label and extract a candidate region by using a local maximum based binarization, to minimize binarization by adding at least two BLOBs at the long exposure frame image and, to extract the candidate region through labeling and, to use a local-mean based binarization to extract a headlight and taillight of long distance in the short exposure frame image to the candidate region;
   a BLOB matching and feature extracting to predict a BLOB location using a BLOB tracking based on the short exposure frame image and to detect a candidate BLOB in a different exposure frame image by designating a BLOB of a location which is closest to a predicted location in the long exposure frame to the same BLOB then, to extract a specific information regarding the candidate BLOB from the different exposure frame image; and
   a MC_SVM (Multi-Class Support Vector Machine) classifying to classify related BLOBs in the different exposure frame image to a headlight, a taillight, a reflector and an illuminant using a MC_SVM (Multi-Class Support Vector Machine) based on the features extracted from the long exposure frame and the short exposure frame; and pairing which detects a pair of BLOBs in the different exposure frame image belonging to the same vehicle by comparing the BLOBs classified as the headlight and taillight in the MC_SVM classifying according to barycentric coordinates.

2. The method for location measurement and night-time forward vehicle detection using a single multi-exposure camera of claim 1 wherein, the preprocessing comprises
   a de-multiplexer to output by rearranging with the long exposure frame image and the short exposure frame image to apply an adequate signal processing method according to the exposure feature after selecting the long exposure frame image and short exposure frame image between four multi-exposure frames, and
   a color to gray converting which converts to a gray image from a color image of the long exposure frame image and the short exposure frame image to detect a candidate region of the headlight and the taillight when using a color camera.

3. The method for location measurement and night-time forward vehicle detection using a single multi-exposure camera of claim 2 wherein, when the color image is a RGB color image, the color image is converted with a linear combination of R, G, B and when the color image is a YBbCr color, a Y signal is used as a gray image.

4. The method for location measurement and night-time forward vehicle detection using a single multi-exposure camera of claim 1 wherein, the local maximum base binarization and labeling which binarize the whole image using a predetermined fixed threshold value (Th_1) and then, conducts labeling and detect a maximum brightness value (p_max) for respective labels and,
   produce a new threshold value (Th_2) according to the maximum brightness value and then, binarize the related label region using the equation $Th\_2 = a \times p\_max$ (but, $0.5 < a < 1$), and after binarizing the related label region, outputs information of respective BLOBs which is labeled.

5. The method for location measurement and night-time forward vehicle detection using a single multi-exposure camera of claim 1 wherein, the local-mean based binarization and labeling comprising a close headlight and taillight being binarized using a predetermined fixed threshold (Th_3) and a far headlight and taillight having a relatively small brightness value being binarized using a local-mean brightness.

6. The method for location measurement and night-time forward vehicle detection using a single multi-exposure camera of claim 1 wherein, the BLOB matching and feature extracting comprising,
   a BLOB matching according to the short exposure frame image to detect which BLOB of a prior frame is identical with a random BLOB of a current frame among the candidate BLOB extracted from the short exposure frame image and matching a BLOB with a minimum moving distance to the same BLOB;
   a motion vector extracting to produce a motion vector (m)(t,l) in respect to a BLOB(b)(t,l) of a current frame using a BLOB matching result generated from the short exposure frame image;
   a reflector removing to exclude a BLOB having a motion vector which differs from the motion vector of a headlight or taillight of a normal vehicle from the candidate BLOB object using a motion vector value produced from a short exposure frame;
   a tracking and location predicting to track a location of respective BLOBs produced during the BLOB matching of the short exposure frame using Kalman Filter, and the measurement value herein is determined with a transverse, vertical direction distance of a barycentric coordinates of a related BLOB and an estimated value is determined with a transverse, vertical direction distance, speed, and acceleration of a barycentric coordinates of a BLOB;

a BLOB matching to match between the short exposure frame image and long exposure frame image determining a BLOB of a closest location the same BLOB using information of a predicted location of respective BLOBs of the long exposure frame image produced from a BLOB tracking of the short exposure frame image and a location information of the candidate BLOB of the long exposure frame image produced from the local-mean based binarization and labeling;

a feature extracting regarding the same BLOB produced from the short exposure frame image and the long exposure frame image and extracts a BLOB feature among information such as color, morphological, geometric, statistics, and motion vector in the short exposure frame image, and extracts a BLOB information of color, morphological, geometric and statistics in the long exposure frame image.

7. A system for location measurement and night-time forward vehicle detection using a single multi-exposure camera comprising, a preprocessing means configured to select a long exposure frame image and short exposure frame image among auto exposure, long exposure, middle exposure and short exposure of a multi-exposure camera;

a candidate BLOB (Binary Large Objects) extracting means configured to label and extract a candidate region by using local maximum based binarization, to minimize binarization by adding least two BLOBs at the long exposure image and, to extract the candidate region through labeling and, to use a local-mean based binarization to extract a headlight and taillight of a long distance in the short exposure frame image to the candidate region;

a BLOB matching and feature extracting means configured to extract feature information of a candidate BLOB in a different exposure frame image after detecting the candidate BLOB in a different exposure frame by considering the BLOB closest to a predicted location of the long exposure frame image after predicting the location of the BLOB using a short exposure frame image based BLOB tracking; and classifying and pairing means comprising, MC_SVM (Multi-Class Support Vector Machine) classifying to classify related BLOBs in the different exposure frame image to headlight, taillight, reflector and illuminant using MC_SVM (Multi-Class SVM) based on the features extracted from the long and short exposure frame and pairing to detect a pair of BLOBs in the different exposure frame image belonging to the same vehicle by comparing according to barycentric coordinates, size and shape of the similarity of the BLOBs which are classified as a headlight and taillight during the MC_SVM classifying.

* * * * *